Figure 1:
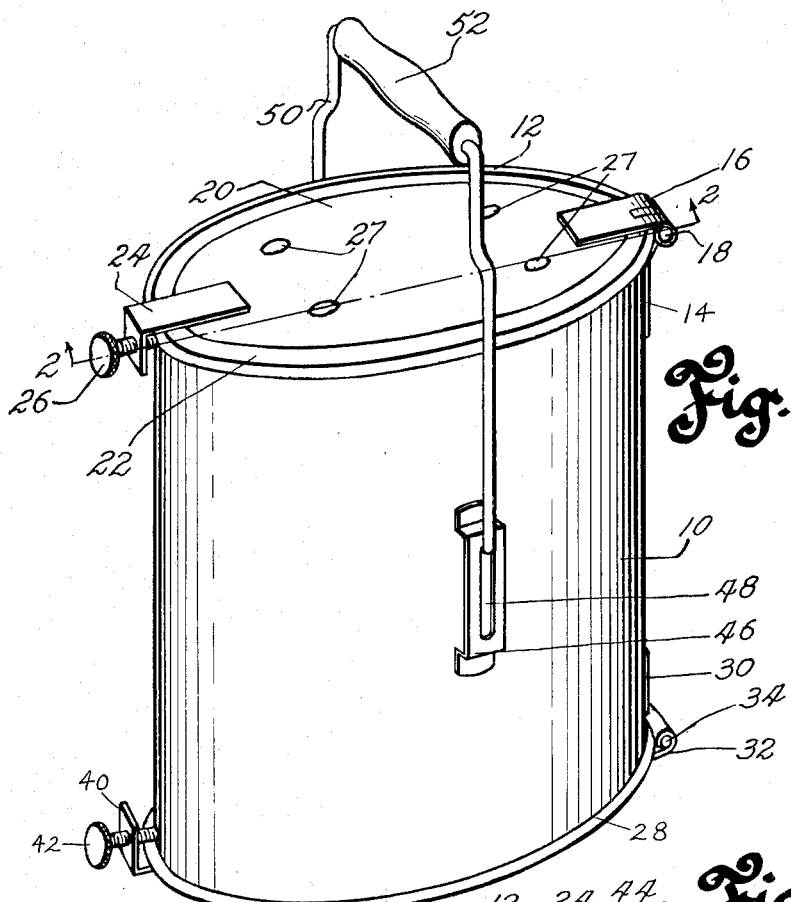

Jan. 18, 1955     F. J. BOBER ET AL     2,699,626
FISHING EQUIPMENT
Filed Dec. 27, 1948

INVENTORS
Frank J. Bober and
BY Thomas T. Bober
Rey Eilers
ATTORNEY

United States Patent Office 2,699,626
Patented Jan. 18, 1955

2,699,626

FISHING EQUIPMENT

Frank J. Bober, St. Louis, and Thomas T. Bober, Richmond Heights, Mo.

Application December 27, 1948, Serial No. 67,376

10 Claims. (Cl. 43—55)

This invention relates to improvements in fishing equipment. More particularly, this invention relates to an improved container which can be used by fishermen to keep worms alive and strong while keeping them available for use as bait.

It is therefore an object of the present invention to provide an improved container which can be used by fishermen to store worms safely while keeping them instantly available for use as bait.

When planning to fish with live bait, fishermen customarily dig, trap, purchase, or otherwise secure the live bait and carry it with them when they go fishing. Where the live bait consists of a number of earthworms, it is customary for the fishermen to procure a number of the worms, place them in a "tin" can, and carry them along to the fishing areas. If the worms are placed in the can without any earth in which to secrete themselves they will be instantly available for use as bait but they will tend to dry out, lose vigor, and die. Particularly is this true where the day is warm and dry. On the other hand, if damp earth is placed in the can with the worms, the worms will secrete themselves in that earth and can remain strong and healthy throughout the day; but they will not be instantly available for use as bait since the fisherman would have to probe through the damp earth until he located and caught one of the worms. In addition, whether or not damp earth is placed in the can, the worms tend to congregate as an entangled mass at the bottom of the can; thus interfering with each other and also making it difficult for the fisherman to extricate just one worm at a time. For these various reasons, prior methods and apparatus for carrying worms are objectionable. The present invention obviates these objections by providing a double-ended, invertible container for worms which carries a quantity of earth and has an openable closure at each of its ends. This container takes advantage of the instinctive action of worms, in moving downwardly through earth, by making it possible to invert the container and open the then-uppermost closure. The worms which had made their way down to the lower areas of the container prior to the inversion of that container will then by lying exposed at the then-uppermost surface of the earth in the container and will be instantly available for use as bait. All that a fisherman need do to locate a worm for use as bait is to open the then-uppermost closure of the container or invert the container and then open the then-uppermost closure of the container. Where a number of worms are desired in a short period of time the container need not be inverted since all of the worms will not move immediately to the bottom of the container and some will remain at the top of the earth in the container. However, where the container is permitted to set for about half an hour, most of the worms will have moved to the lower areas of the container and it will be necessary to invert the container. In all instances, worms will be held instantly available to the fisherman. It is therefore an object of the present invention to provide a double-ended, invertible container which has openable closures at each of its ends.

The openable closures of the container provided by the present invention must provide a close fit with the body of that container to keep the worms from escaping. Worms are invertebrates and can greatly change their lengths and thicknesses; and even large earthworms can slip through openings which are rather narrow. Where the container is liable to be set on a muddy or sandy bank or on a pile of loose gravel at the fishing areas, the problem of attaining a close fit with the body of the container is complicated since sand or gravel or even dried lumps of mud can lodge within the body of the container and prevent full seating of the closures. The present invention assures a close fit between the closures and the body of the container by providing a flange or edge on each of the closures that scrapes against the sides of the container. The scraping action scrapes the sides of the container clean and enables the flange or edge to press into close engagement with the sides of the container. As a result, a close fit is assured at all times and the worms cannot escape. It is therefore an object of the present invention to provide a flange or edge on each of the closures of a container which can scrape the sides of the container and provide a close fit with those sides.

Once the container has been set in a desired position it should be kept in that position until worms are needed. To facilitate the maintenance of the container in either of two positions and yet make it easy to carry the container, a handle attachment is provided that permits the container to be selectively carried in ordinary or inverted position. As a result, the container can be set and maintained in either of two positions while being carried. It is therefore an object of the present invention to provide a handle attachment for containers which permits the container to be carried in an ordinary or an inverted position.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purposes of illustration only and do not limit the invention and that the invention will be defined by the appended claims.

Figure 2:
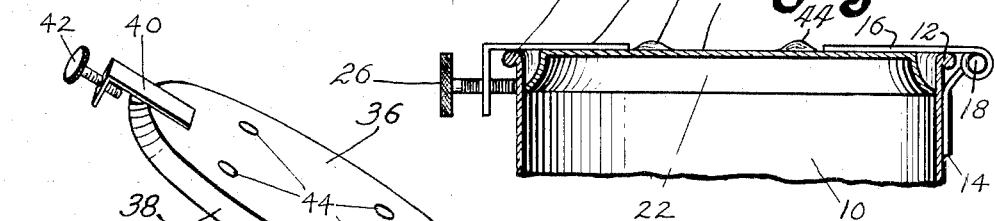
Figure 3:
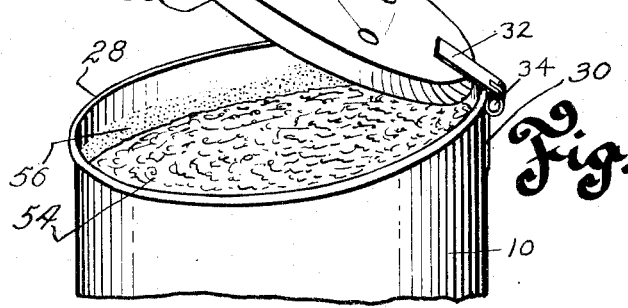

In the drawing,

Fig. 1 is a perspective view of a container for worms that is made in accordance with the principles and teachings of the present invention, Fig. 2 is a partial cross-sectional view of one end of the container shown in Fig. 1 and is taken along the plane indicated by the line 2—2 in Fig. 1, and Fig. 3 is a perspective view of the other end of the container of Fig. 1 after that container has been inverted and the then-uppermost closure opened.

Referring to the drawing in detail, the numeral 10 denotes the body portion of a container that can be used to carry and confine worms. This body portion is open at both ends; and one of its ends is provided with a stiffening bead 12 which projects radially outwardly beyond the surface of the body portion 10. A fixed hinge plate 14 is secured to the wall of body portion 10 adjacent the bead 12, and that hinge plate is secured to a movable hinge plate 16 by hinge pin 18. The movable hinge plate 16 carries an openable closure 20 which has a diameter slightly smaller than that of the body portion 10 of the container. The hinge plates 14 and 16 and the hinge pin 18 are made quite wide so the closure 20 will always be kept "true" with relation to the body portion 10.

The closure 20 has a flared, projecting flange 22 extending from the surface thereof, and the free edge of the flange 22 extends outwardly beyond the edge of the closure 20. The outwardly extending edge of the flared flange 22 is dimensioned so it will engage and scrape against the inner face of the body portion 10 of the container whenever the closure 20 is opened and closed. In this way, a close fit between the closure 20 and the body portion 10 is always assured when the closure 20 is in closed position.

The hinge plate 16 is dimensioned to lie on the top of the closure 20 and to span the distance between the edge of closure 20 and the outer periphery of bead 12. This plate is flat and occupies but little space; thereby making it possible to rest the container on closure 20. The hinge plates 16 and 14 can be secured to the body portion 10 by soldering, brazing, riveting or other methods, as desired. The engagement between hinge plates 14 and 16 and hinge pin 18 will be close enough to keep the closure 20 true, but will not be so tight as to prevent relatively free rotation of the closure 20 into and out of closed position.

An L-shaped bracket 24 is secured to the closure 20 at the other end of the diameter which extends from the movable hinge plate 16. Like hinge plate 16, bracket 24 is flat and occupies but little space, thereby making it possible to rest the container on the closure 20. The L-shaped bracket 24 can be secured to the closure 20 as by soldering, brazing, riveting or other methods. The bracket 24 spans the distance between the edge of closure 20 and the bead 12 of body portion 10.

The L-shaped bracket 24 carries a knurled screw 26 which is threaded into that bracket. Rotation of the screw 26 will cause movement of the inner end of that screw toward or away from the body portion 10 of the container. The vertically-disposed portion of the bracket 24 is dimensioned so the inner end of the knurled screw 26 will be in register with that section of the body portion immediaately adjacent the bead 12 on the body portion 10 whenever the closure 20 is in closed position. As a result, the inner end of knurled screw 26 can be rotated until it underlies bead 12 and prevents opening of closure 20. This provides positive locking of the closure 20 in position yet it facilitates ready opening of that closure. Accordingly, bead 12 not only stiffens body portion 10 but also assists in holding the closure 20 in closed position. A number of bumps or projections 27 extend from the surface of the closure 20 a distance equal to or greater than the thickness of the hinge plate 16 or the L-shaped bracket 24, and those bumps or projections constitute, either alone or in conjunction with hinge plate 16 or bracket 24, spaced points of support on which closure 20 can rest solidly. Thus the container can readily be set solidly on closure 20 whether the container be placed on a dry or muddy surface.

A bead 28, identical to the bead 12 at the one end of body portion 10, is provided at the other end of that body portion. As in the case of the bead 12, the bead 28 serves to stiffen the body portion 10 and also serves to cooperate with a bracket to lock an openable closure in closed position. A fixed hinge plate 30, identical to the fixed hinge plate 14 at the one end of body portion 10, is provided at the other end of body portion 10, and that hinge plate is connected to a movable hinge plate 32 by hinge pin 34. The movable hinge plate 32 is connected to and supports an openable closure 36 which is provided with a flared, projecting flange 38. The flange 38 is dimensioned so it provides a scraping fit with the interior of the body portion 10, in exactly the same way as the flange 22 of closure 20 provides a scraping fit with the interior of the body portion 10. A bracket 40, similar to the L-shaped bracket 24, is provided for the closure 36; and that bracket is oppositely disposed of the movable hinge plate 32. A knurled screw 42 is rotatably mounted in the L-shaped bracket 40, and that screw is identical to and performs the same function as the knurled screw 26 which is supported by bracket 24. The projections 44 on the closure 36 are identic to and perform the same function as projections 27; in that they assist in stiffening the closure 36 while enabling the container to be set solidly on closure 36.

A bracket 46 is secured at each side of the body portion 10 by soldering, brazing, riveting or other methods, and each of those brackets is provided with a longitudinally-extending, elongated slot 48. The slots 48 extend above and below the center of gravity of the container 10. A bail 50 has its ends extending into the slots 48 of the brackets 46, and it is provided with a handle 52. The bail 50 is long enough that it will readily pass by the brackets 24 and 40, knurled screws 26 and 42, and hinge plates 16 and 32; thus that bail can be set to carry the container in the position shown in Fig. 1 or in the position shown in Fig. 3. In either position of the container, the bail 50 can be moved to one side so the closures 20 and 36 can be opened without any interference with that bail.

In use, the container is set so one or the other of the closures 20 or 36 is resting on the ground and so it is solidly locked against opening. This is done by rotating the knurled screw, carried by that closure, until it engages that section of the body portion 10 which is immediately adjacent the bead at the end of the body portion. Thereafter, a quantity of fresh earth is placed in the container, the other closure is opened, and a quantity of worms placed upon the fresh earth. The worms will secrete themselves within the earth in a rather short time and will thus be protected against dehydration. The worms can safely be carried for many hours in the container; and when a worm is needed for bait purposes the container need only be inverted and the then-uppermost closure opened. Prior to the inversion of the container, the then-uppermost closure would be securely locked against opening to prevent escape of the worms after inversion of the container.

The worms which can be found at the surface of the earth after the container has been inverted will soon begin to work their way down through the earth. This recurrent movement of the worms through the earth keeps them active and healthy and keeps them from becoming entangled with each other. Moreover this movement of the worms causes them to move to fresh sections of the earth; and this also is beneficial to the worms. Whenever the container is inverted the earth will shift downwardly against the then-lowermost closure, and the worms will work their way down to that closure.

The flared, projecting flanges 22 and 38 on the closures 20 and 36 must have a close fit with the interior of the body portion 10 because worms can crawl out of surprisingly small openings. With the scraping fit provided between the closures 20 and 36 and the body portion 10, no forseeable elongation of the worms could reduce their cross sections sufficiently to enable those worms to escape between the body portion and the closures.

As shown in Fig. 3, the scraping engagement between the flared projecting flanges of the closures and the interior of the body portion actually keeps that interior clean. The fresh earth within the body portion 10 is denoted by the numeral 54; and the usual coating of dirt or sand above that earth is denoted by the numeral 56. The surface above the coating 56 is kept clean by the scraping action of the flared projecting flange 38. A similar action occurs with the flared projecting flange 22 at the other end of the body portion 10. This scraping action is extremely helpful because the fisherman oftentimes has to set his equipment in mud, sand or gravel. In the absence of this scraping action, a particle of gravel, a hard lump of dirt, or some large particles of sand could lodge between the closure and the wall of the body portion and provide a gap through which worms could crawl out.

This container is not only useful in keeping worms instantly available for the fisherman on the fishing trip, but it also makes it possible to store worms between fishing trips. By merely inverting the container every other day or so and occasionally replenishing the moisture which gradually evaporates away, worms can be kept in the container for well over three months. The inversion of the container is made easy because both closures can support the container.

Whereas a preferred embodiment of the present invention has been shown and described in the drawing and accompanying description, it should be obvious to those skilled in the art that various changes may be made in the form of the invention without affecting the scope thereof.

What we claim is:

1. A light-weight, readily portable, double-ended, invertible container that can receive worms and earth and that comprises a thin walled body portion open at both ends, an openable closure of flat, thin material for each of said ends of said body portion, hinges pivotally securing said closures to said body portion, a flared, outwardly projecting flange on each of said closures, said flanges being dimensioned to engage the interior surface of said body portion and scrape mud, dirt, sand or gravel from portions of said surface and thereby assure a close fit with said body portion, a plurality of handle attachments secured to said body portion, an elongated slot in each of said handle attachments, said slots extending above and below the center of gravity of said body portion, a handle reciprocable in said slots, a plurality of projections on each of said closures, said projections providing spaced points of support on which said container can be set, a bead adjacent each end of said body portion, and a latch carried by each of said closures, said latches being selectively engageable with said beads to releasably secure said closures in closed position, said container being invertible to render each closure selectively accessible, and said closures being selectively openable to provide access to the earth and worms carried within said body portion.

2. A light-weight, readily portable, double-ended, invertible container that can receive worms and earth and that comprises a thin walled body portion open at both ends, an openable, pivoted closure of flat material for each of said ends of said body portion, and a flared, outwardly projecting flange on each of said closures, said flanges being dimensioned to engage the inner sides of said body portion and scrape mud, dirt, sand, or gravel from said sides and thereby assure a close fit with said sides, said container being invertible to render each closure selectively accessible, and said closures being selectively openable to provide access to the earth and worms carried within said body portion.

3. A light-weight, readily portable, double-ended, invertible container that can receive worms and earth and that comprises a thin walled body portion open at both ends, an openable closure for each of said ends of said body portion, hinges pivotally securing said closures to said body portion, a flange on each of said closures that extends outwardly and that is dimensioned to provide a close fit with the sides of said body portion, a bead at each end of said body portion, and a latch carried by each of said closures, said latches being engageable with said beads to prevent accidental opening of said closures, said container being invertible to render each closure selectively accessible, said closures being selectively openable to provide access to the earth and worms carried within said body portion, and said closures coacting with said beads to selectively provide a firm support on a smooth or rough surface on which said container can be set.

4. A light-weight, readily portable, double-ended, invertible container that can receive worms and earth and that comprises a thin walled body portion open at both ends, an openable, pivoted closure of flat material for each of said ends of said body portion, a flared, outwardly projecting flange on each of said closures, said flanges being dimensioned to engage the inner sides of said body portion and scrape mud, dirt, sand, or gravel from said sides and thereby assure a close fit with said sides, said container being invertible to render each closure selectively accessible, said closures being selectively openable to provide access to the earth carried within said body portion, said closures being dimensioned to fit within said body portion, and said flanges extending from said closures to the inner surface of said body portion.

5. A light-weight, readily portable, double-ended, invertible container that can receive worms and earth and that comprises a thin walled body portion open at both ends, an openable closure for each of said ends of said body portion, said closures being engageable with the inner surfaces of said body portion, latches that releasably secure said closures in closed position relative to said body portion, said container being invertible to render each of said closures selectively accessible, each of said closures being selectively openable to provide access to the earth and worms within said container, a handle for said container, and handle attachments on said body portion that secure said handle to said body portion, and said container being adapted to be carried in either an upright or an inverted position by said handle.

6. A light-weight, readily portable, double-ended, invertible container that can receive worms and earth and that comprises a thin walled body portion open at both ends, an openable closure for each of said ends of said body portion, a flared, outwardly projecting flange on each of said closures, said flanges being dimensioned to engage the inner sides of said body portion and scrape mud, dirt, sand, or gravel from said sides and thereby assure a close fit with said sides, said container being invertible to render each closure selectively accessible, said closures being selectively openable to provide access to the earth carried within said body portion, and a stiffening bead at each end of said body portion, said beads and said flanges maintaining the conformity of said closures and said body portion, and said closures coacting with said beads to selectively provide a firm support on a smooth or rough surface on which said container can be set.

7. A light-weight, readily portable, double-ended, invertible container that can receive worms and earth and that comprises a hollow body portion open at both ends, and an openable closure for each of said ends, said closures being movable relative to said body portion to selectively dispose the edges of said covers within said body portion, said closures being dimensioned to scrape against and provide a close fit with the inner surface of said body portion and thereby prevent escape of worms, said container being adapted to be selectively rested on one or the other of the ends of said body portion and being invertible to render each closure selectively accessible, and said closures being selectively openable to provide access to the earth carried within said body portion.

8. An angler's bait container comprising a tubular body having open ends, releasable lids for respectively closing each open end of said tubular body, a hanger having a pivot member, and means for associating the container with the pivot member comprising an element attached to said tubular body and having an elongated slot therein extending substantially parallel with the longitudinal axis of the tubular body, the respective ends of the slot constituting successive points of suspension for said pivot member upon turning said tubular body end for end about the axis of said pivot member.

9. An angler's bait container comprising a tubular body having open ends, lids respectively hinged to the body of the ends thereof and adapted to close the open ends of the body, releasable latch means for holding the lids in closed position over the open ends of the body, a member, provided with a slot affixed to the wall of the tubular body, the slot in said member extending substantially parallel with the longitudinal axis of said tubular member with the ends thereof spaced substantially equally from the respective ends of said tubular body, and a hanger having a pivot member rotatably and slidably engaged in said slot and disposed upon an axis extending substantially at right angles to the first mentioned axis.

10. An angler's bait container comprising a tubular body having open ends, releasable lids for respectively closing each open end of said tubular body, a member, provided with a slot affixed to the wall of the tubular body, the ends of the slot in said member being respectively above and below the center of gravity of the container, and a hanger for the tubular body having a pivot member rotatably and slidably engaged in said slot and disposed upon an axis extending substantially at a right angle to the longitudinal axis of said tubular body, whereby the container may be turned end for end about the axis of the pivot member and suspended from said pivot member successively at the respective ends of said slot with the center of gravity below said pivot member.

References Cited in the file of this patent

UNITED STATES PATENTS

| Number | Name | Date |
|---|---|---|
| 263,448 | Withey | Aug. 29, 1882 |
| 475,977 | Dillingham | May 31, 1892 |
| 526,574 | Houghton | Sept. 25, 1894 |
| 539,917 | Kingsbury | May 28, 1895 |
| 872,998 | Kruse | Dec. 3, 1907 |
| 880,834 | Stollberg | Mar. 3, 1908 |
| 1,326,124 | Vischer | Dec. 23, 1919 |
| 1,328,672 | Hirsohn | Jan. 20, 1920 |
| 1,743,799 | Patterson | Jan. 14, 1930 |
| 2,179,095 | Kelsey | Nov. 7, 1939 |
| 2,297,843 | Sharpnack | Oct. 6, 1942 |
| 2,436,109 | Kollman | Feb. 17, 1948 |

FOREIGN PATENTS

| 386,418 | Great Britain | Jan. 19, 1933 |